United States Patent
Zha

(10) Patent No.: US 10,261,957 B2
(45) Date of Patent: Apr. 16, 2019

(54) METHOD AND APPARATUS FOR NAVIGATING INFORMATION RECORDS

(71) Applicant: Tencent Technology (Shenzhen) Company Limited, Shenzhen (CN)

(72) Inventor: Wen Zha, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 348 days.

(21) Appl. No.: 15/156,106

(22) Filed: May 16, 2016

(65) Prior Publication Data
US 2016/0328458 A1 Nov. 10, 2016

Related U.S. Application Data

(63) Continuation of application No. PCT/CN2014/093403, filed on Dec. 9, 2014.

(30) Foreign Application Priority Data

Dec. 10, 2013 (CN) .......................... 2013 1 0665345

(51) Int. Cl.
*G06F 17/30* (2006.01)
*G06F 16/248* (2019.01)
(Continued)

(52) U.S. Cl.
CPC .......... *G06F 16/248* (2019.01); *G06F 3/0482* (2013.01); *G06F 3/0485* (2013.01); *G06F 3/04817* (2013.01); *G06F 17/30554* (2013.01)

(58) Field of Classification Search
CPC ......... G06F 17/30749; G06F 17/30867; G06F 17/3087; H04M 15/58
See application file for complete search history.

(56) References Cited

U.S. PATENT DOCUMENTS 8,516,525 B1 8/2013 Jerding et al.
2007/0094042 A1* 4/2007 Ramer .............. G06F 17/30867
705/1.1
(Continued)

FOREIGN PATENT DOCUMENTS

CN 102521251 A 6/2012
CN 102549577 A 7/2012
(Continued)

OTHER PUBLICATIONS

Tencent Technology, ISRWO, PCT/CN2014/093403, dated Mar. 16, 2015, 8 pgs.
(Continued)

Primary Examiner — Angelica Ruiz
(74) Attorney, Agent, or Firm — Morgan, Lewis & Bockius LLP

(57) ABSTRACT

A method for navigating in a record list is disclosed. In some embodiments, the method is performed at a terminal device having one or more processors and memory for storing programs to be executed by the one or more processors. The method includes detecting operational information of a user when the user operates the terminal device to navigate in the record list that is displayed in a user interface of the terminal device. The method also includes estimating, based on the operational information of the user, location information of a target record in the record list. The method further includes updating the user interface of the terminal device by introducing, based on the location information of the target record, a record access tool in the user interface of the terminal device. As a result, the user can accelerate access of the target record using the record access tool.

16 Claims, 8 Drawing Sheets

(51) Int. Cl.
*G06F 3/0485* (2013.01)
*G06F 3/0481* (2013.01)
*G06F 3/0482* (2013.01)

(56) References Cited

U.S. PATENT DOCUMENTS

| | | | | |
|---|---|---|---|---|
| 2007/0100650 | A1* | 5/2007 | Ramer | G06F 17/30749 |
| | | | | 705/26.1 |
| 2007/0198111 | A1* | 8/2007 | Oetzel | G06F 3/04855 |
| | | | | 700/94 |
| 2008/0242279 | A1* | 10/2008 | Ramer | G06F 17/30864 |
| | | | | 455/414.2 |
| 2008/0243375 | A1* | 10/2008 | Han | G01C 21/367 |
| | | | | 701/455 |
| 2011/0202874 | A1* | 8/2011 | Ramer | G06F 17/30398 |
| | | | | 715/810 |
| 2012/0011153 | A1* | 1/2012 | Buchanan | G06F 21/552 |
| | | | | 707/771 |
| 2012/0166477 | A1 | 6/2012 | Arrouye et al. | |
| 2013/0096819 | A1* | 4/2013 | Tarnok | G01C 21/00 |
| | | | | 701/428 |
| 2013/0219285 | A1* | 8/2013 | Iwasaki | H04M 1/7253 |
| | | | | 715/740 |
| 2013/0345978 | A1* | 12/2013 | Lush | G01C 21/00 |
| | | | | 701/533 |
| 2014/0344249 | A1 | 11/2014 | Magistrado | |

FOREIGN PATENT DOCUMENTS

| | | |
|---|---|---|
| CN | 102693077 A | 9/2012 |
| CN | 102982123 A | 3/2013 |
| CN | 103067608 A | 4/2013 |
| CN | 103250175 A | 8/2013 |

OTHER PUBLICATIONS

Tencent Technology, IPRP, PCT/CN2014/093403, dated Jun. 14, 2016, 6 pgs.

\* cited by examiner

METHOD AND APPARATUS FOR NAVIGATING INFORMATION RECORDS

PRIORITY CLAIM AND RELATED APPLICATION

This application is a continuation application of PCT Patent Application No. PCT/CN2014/093403, entitled "METHOD AND APPARATUS FOR NAVIGATING INFORMATION RECORDS" filed on Dec. 9, 2014, which claims priority to Chinese Patent Application Serial No. 201310665345.4, entitled "A method and apparatus for searching information records," filed on Dec. 10, 2013, both of which are incorporated herein by reference in their entirety.

FIELD OF THE APPLICATION

The present application generally relates to the field of Internet communications, and more particularly to a method and related apparatus for navigating information records using a terminal device.

BACKGROUND

With the rapid development of Internet and mobile technologies, a large number of software applications have been developed for different types of smart devices. Such software applications typically implement and present to users various information record lists such as a contact list, an email list, a message list, etc. A user of a smart device can search an information record by navigating through an information record list. It is difficult, however, for the user to locate a target information record by navigating through a long list of information records, which results in low efficiency in searching. Some known software applications implement a search bar to enable a search function for the information record lists. Such a search bar, however, typically occupies a fixed portion of display space in the user interface, which might be wasteful when the search bar is not used by the user.

Thus, a need exists for a method and apparatus that can enable an intelligent and efficient searching mechanism without sacrificing display space of a user interface.

SUMMARY

The above deficiencies associated with smart devices and/or software applications may be reduced or eliminated by the techniques described herein.

In some embodiments, a method for navigating in a record list is performed at a terminal device having one or more processors and memory for storing programs to be executed by the one or more processors. The method includes detecting operational information of a user when the user operates the terminal device to navigate in the record list that is displayed in a user interface of the terminal device. The method also includes estimating, based on the operational information of the user, location information of a target record in the record list. The method further includes updating the user interface of the terminal device by introducing, based on the location information of the target record, a record access tool in the user interface of the terminal device. As a result, the user can accelerate access of the target record using the record access tool. In some instances, the record access tool is not introduced in the user interface of the terminal device in absence of the estimating the location information of the target record in the record list.

In some instances, the record access tool is a search bar such that the user can accelerate access of the target record by searching a key word associated with the target record using the search bar. In such instances, the operational information indicates a speed of the user navigating through the record list. Furthermore, the method includes estimating the location information of the target record by comparing the speed of the user navigating through the record list with a predefined threshold.

In some instances, the record access tool is a navigation icon such that the user interface is updated to display a predetermined record from the record list in response to the user activating the navigation icon. In such instances, the operational information indicates a direction of the user navigating through the record list. Furthermore, the predetermined record from the record list can be one of the first record and the last record from the record list.

In some embodiments, a terminal device includes one or more processors and memory storing one or more programs for execution by the one or more processors. The one or more programs include instructions that cause the terminal device to perform the method for navigating in a record list as described above. In some embodiments, a non-transitory computer readable storage medium stores one or more programs including instructions for execution by one or more processors. The instructions, when executed by the one or more processors, cause the processors to perform the method for navigating in a record list at a terminal device as described above.

BRIEF DESCRIPTION OF DRAWINGS

The aforementioned features and advantages of the present application as well as additional features and advantages thereof will be more clearly understood hereinafter as a result of a detailed description of preferred embodiments when taken in conjunction with the drawings.

FIG. 2-1 is a flowchart illustrating another method performed at a terminal device for navigating in a record list in accordance with some embodiments.

FIGS. 2-2~2-6 are schematic diagrams illustrating user interfaces of a terminal device associated with the method in FIG. 2-1.

FIG. 3 is a block diagram of a terminal device configured to navigate in a record list in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
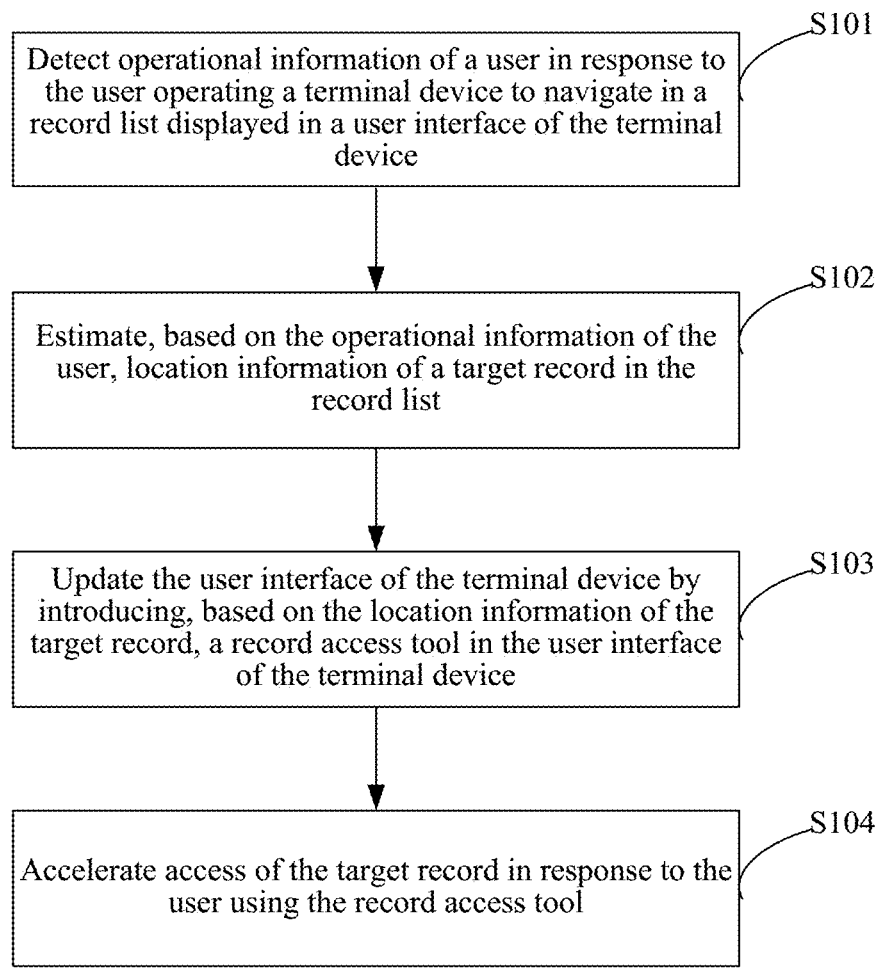
FIG. 1 is a flowchart illustrating a method performed at a terminal device for navigating in a record list in accordance with some embodiments.

FIG. 1 is a flowchart illustrating a method 100 performed at a terminal device for navigating in a record list in accordance with some embodiments. The terminal device performing the method 100 can be any type of device that is configured to enable a user of the terminal device to navigate one or more record lists associated with (e.g., stored in and presented at) the terminal device. Moreover, the terminal device is configured to enable the user to locate one or more particular records from the record lists. Such a terminal device can be configured to be operatively coupled to and communicate with one or more other devices (e.g., servers) via one or more network(s) (e.g., the Internet).

In some embodiments, the terminal device performing the method 100 can be, for example, a cellular phone, a smart phone, a mobile Internet device (MID), a personal digital assistant (PDA), a palmtop computer, a tablet computer, an e-reader, a laptop computer, a handheld computer, a wearable device, a desktop computer, a vehicle terminal, and/or the like. In some embodiments, such a terminal device can be referred to as, for example, a client device, a user device, a mobile device, a portable device, a terminal, and/or the like. Details of a terminal device are shown and described below with respect to FIG. 3.

A record list associated with the terminal device performing the method 100 can be any type of list storing informational records. Each record from the record list can be a unit (e.g., an item, entity, file) that stores a piece of information. Information stored in a record can be in any suitable form such as, for example, textual entry, picture, file, binary data, number, audio clip, video clip, and/or the like. The record list can be, for example, a chapter list of a book, an index of items, a list of pictures, a contact list, a list of messages, a list of emails, a list of songs, a list of website addresses, a list of phone records, and/or the like.

In some embodiments, each record from the record list is associated with one or more key words, which can be used to locate that record from the record list. For example, each contact in a phone contact list can be searched based on a first name, a last name, or a phone number of that contact. For another example, each song from a list of songs (e.g., a song index of an album) can be searched based on a word in a title of that song. In some embodiments, metadata of a record can be used to search that record from a record list. For example, each email from an email list (e.g., in an inbox of an email account) can be searched based on a sender's email address of that email. For another example, each picture from a list of pictures (e.g., a gallery) can be searched based on a time when that picture was taken.

A user operating the terminal device performing the method 100 can be any person interested in acquiring information of the records from the record list(s) associated with the terminal device. For example, the user can be interested in acquiring general information of records from a record list (e.g., titles of each chapter of a book). For another example, the user can be interested in acquiring detailed information of a specific record from a record list (e.g., all contact information of a contact in a contact list). Either way, the user typically needs to locate the record of interest from the record list.

The terminal device performing the method 100 includes a display device (e.g., a screen, a monitor) such that information of the record list(s) associated with the terminal device can be presented to a user of the terminal device via the display device. To browse a record list or locate a record of interest from the record list, the user operates the terminal device to display (i.e., use the display device of the terminal device) the record list in a user interface of the terminal device. The user can then operate the terminal device to browse and/or navigate records from the record list.

In some embodiments, the terminal device performing the method 100 can include one or more processors and memory. In such embodiments, the method 100 is governed by instructions or code of an application that are stored in a non-transitory computer readable storage medium of the terminal device and executed by the one or more processors of the server device. The application is associated with enabling efficient navigation of record lists for users of the terminal device. Such an application typically is stored in a memory of the terminal device, and executed at a processor of the terminal device. As a result of the application being executed, the method 100 is performed at the terminal device. As shown in FIG. 1, the method 100 includes the following steps.

At S101, the terminal device detects operational information of the user in response to the user operating the terminal device to navigate in the record list displayed in the user interface of the terminal device. The operational information detected by the terminal device is associated with operations performed by the user on the terminal device. Such operational information can include information of, for example, the user sliding a touch screen of the terminal device, the user clicking a scroll arrow in the user interface, the user clicking a functional button in the user interface, and/or the like. The user can perform operations on the terminal device using, for example, her finger (e.g., on a touch screen), a mouse, a stylus pen, a physical button on the terminal device, a keyboard, or any other suitable input device or tool. In some embodiments, the user can perform operations on the terminal device using a voice control function of the terminal device.

In some embodiments, the user can operate the terminal device to navigate the record list displayed in the user interface of the terminal device in any suitable method. For example, the user can scroll (e.g., using her finger or a stylus pen) a touch screen of the terminal device toward a specific direction (e.g., up, down, right, left) such that records from the record list move through the user interface. For another example, the user can click a scroll arrow (e.g., an arrow pointing to up, down, right or left) in the user interface to move records from the record list through the user interface. For yet another example, the user can click a navigation icon (e.g., a "next page" button) to move from a display of a set of records (e.g., a first page) to a display of another set of records (e.g., a second page).

The operational information detected by the terminal device can include information of any type of characteristic of the operations performed by the user on the terminal device. In some embodiments, the operational information includes information of a range of records that have been displayed in the user interface (and presumably viewed by the user). In such embodiments, the range of records can be measured and detected in various methods. For example, the operational information includes a number of records (e.g., 5, 10, 15) that have been displayed in the user interface. For another example, the operational information includes a number of pages (e.g., 2 pages, 3 pages, 4 pages) that have been displayed in the user interface (where a substantially identical number or different numbers of records can be displayed in each page). For yet another example, the operational information includes a number of times the user clicks a "next page" button in the user interface (which is substantially equivalent to the number of pages that have been displayed in the user interface). For yet another example, the operational information includes a distance (e.g., 10 centimeters, 5 inches) over which the display of the user interface has been scrolled.

In some embodiments, the operational information includes information of a speed of the user navigating through the record list. The speed of the navigation can be calculated as a range of records that have been displayed in the user interface (described above) per unit of time (e.g., per second, per minute). Such a speed can be measured by, for example, a number of pages retrieved in a minute, a number of records displayed in 10 seconds, a distance scrolled in the display of the user interface in 1 second, and/or the like.

In some embodiments, the operational information includes information of a direction of the user navigating through the record list. Such information can indicate that the user navigates the record list in, for example, a forward direction (i.e., from the beginning of the record list towards the end of the record list), a backward direction (i.e., from the end of the record list towards the beginning of the record list), a random direction (i.e., a combination of forward and backward movements), or any other predefined direction.

At S102, the terminal device estimates, based on the operational information of the user, location information of a target record in the record list. The location information indicates one or more target record(s) in the record list, which is the user interested to view in the user interface. Such location information is estimated based on the operational information detected by the terminal device. In some embodiments, the location information can be estimated by the terminal device based on comparing the detected operational information with, for example, a predefined threshold.

In some embodiments, the terminal device can determine, based on that the user navigates the record list with a speed lower than a predefined threshold (e.g., one record every two seconds, one page per minute, 10 centimeters every 5 seconds, etc.), that the user is currently viewing or reading the record(s) displayed in the user interface. Thus, the terminal device is refrained from introducing a record access tool that enables the user to locate a record not currently displayed in the user interface. Similarly stated, if the terminal device detects, based on the operational information, that the user spends more time than a predefined threshold (e.g., 2 seconds, 5 seconds, 1 minute, etc.) on viewing a record displayed in the user interface, the terminal device determines that the user is interested in viewing that record rather than interested in searching for another record from the record list that is not currently displayed in the user interface. Thus, the terminal device does not introduce (e.g., display in the user interface) a record access tool that assist the user to locate a record not currently displayed in the user interface.

In some embodiments, the terminal device can determine, based on that the user navigates the record list with a speed greater than a predefined threshold (e.g., one record every two seconds, one page per minute, 10 centimeters every 5 seconds, etc.), that the user is searching for a particular record (or records) from the record list rather than viewing or reading the record(s) currently displayed in the user interface. Thus, the terminal device can introduce a record access tool (e.g., a search bar) that enables the user to search for a record from the record list. Similarly stated, if the terminal device detects, based on the operational information, that the user spends less time than a predefined threshold (e.g., 2 seconds, 5 seconds, 1 minute, etc.) on viewing a record displayed in the user interface, the terminal device determines that the user is interested in locating a record not currently displayed in the user interface rather than viewing the record(s) currently displayed in the user interface. Thus, the terminal device introduces (e.g., display in the user interface) a record access tool that assist the user to locate a record not currently displayed in the user interface. Furthermore, in some embodiments, the terminal device can determine that the user is searching for a particular record from the record list based on any other suitable operational information of the user such as, for example, the user navigates the record list in a random direction (i.e., a combination of forward and backward movements).

In some embodiments, the terminal device can determine, based on the operational information of the user, that the user is interested in getting to a particular location in the record list. The operational information can include, for example, information indicating the navigation speed, information indicating the navigation direction, etc., or a combination of different types of operational information. The particular location in the record list can be, for example, the beginning of the record list, the end of the record list, a middle point of the record list, the beginning of the current page, and/or the like.

For example, the terminal device can determine, based on the user navigates the record list at a speed lower than a first predefined threshold (e.g., one record every two seconds), that the user is viewing the record(s) currently displayed in the user interface. Thus, the terminal device remains displaying the current user interface without introducing a record access tool to accelerate navigation. The terminal device can determine, based on the user navigates the record list at a speed higher than the first predefined threshold and lower than a second predefined threshold (e.g., one record per second), that the user is searching for a record from the record list. Thus, the terminal device introduces (e.g., display in the user interface) a record access tool (e.g., a search bar) to enable a searching function for the user. The terminal device can determine, based on the user navigates the record list at a speed higher than the second predefined threshold and in a fixed direction (e.g., forward, backward) for a period of time, that the user is trying to reach a particular location of the record list (e.g., the beginning of the record list, the end of the record list). Thus, the terminal device introduces (e.g., display in the user interface) a record access tool (e.g., a navigation icon) to enable the user to get to that particular location of the record list directly.

At S103, the terminal device updates the user interface of the terminal device by introducing, based on the location information of the target record, a record access tool in the user interface of the terminal device. The record access tool can be any type of tool that can be displayed in the user interface and can, if used by the user, assist the user to accelerate access of the record list (e.g., locate the target record quickly). Such a record access tool can include, for example, a search bar, a navigation icon, a pop-up window, an alert message, any other suitable type of tool, or any combination of different types of tools. For example, if the location information of the target record estimated by the terminal device indicates that the user is searching for a particular record from the record list, the terminal device can update the user interface by displaying a search bar in the user interface. For another example, if the location information of the target record estimated by the terminal device indicates that the user is trying to reach a particular location of the record list (e.g., the beginning of the record list, the end of the record list, etc.), the terminal device can update the user interface by displaying a navigation icon (e.g., an up-arrow button indicating to the beginning of the record list, a down-arrow button indicating to the end of the record list, etc.) in the user interface.

As a result, at S104, the terminal device accelerates access of the target record in response to the user using the record access tool. For example, the user enters a key word associated with a target record into the search bar and activates the search (e.g., by clicking a search button in the user interface, by pressing the enter key in a keyboard, etc.), then the terminal device executes a search in the record list based on the entered key word, and displays one or more records from the record list, as the search result, in the user interface. For another example, the user activates (e.g., by clicking) a navigation icon (e.g., an up-arrow button) directing to the beginning of the record list, then the terminal device displays, in the user interface, a beginning portion of the record list including at least the first record from the record list.

Figures 1, 2:
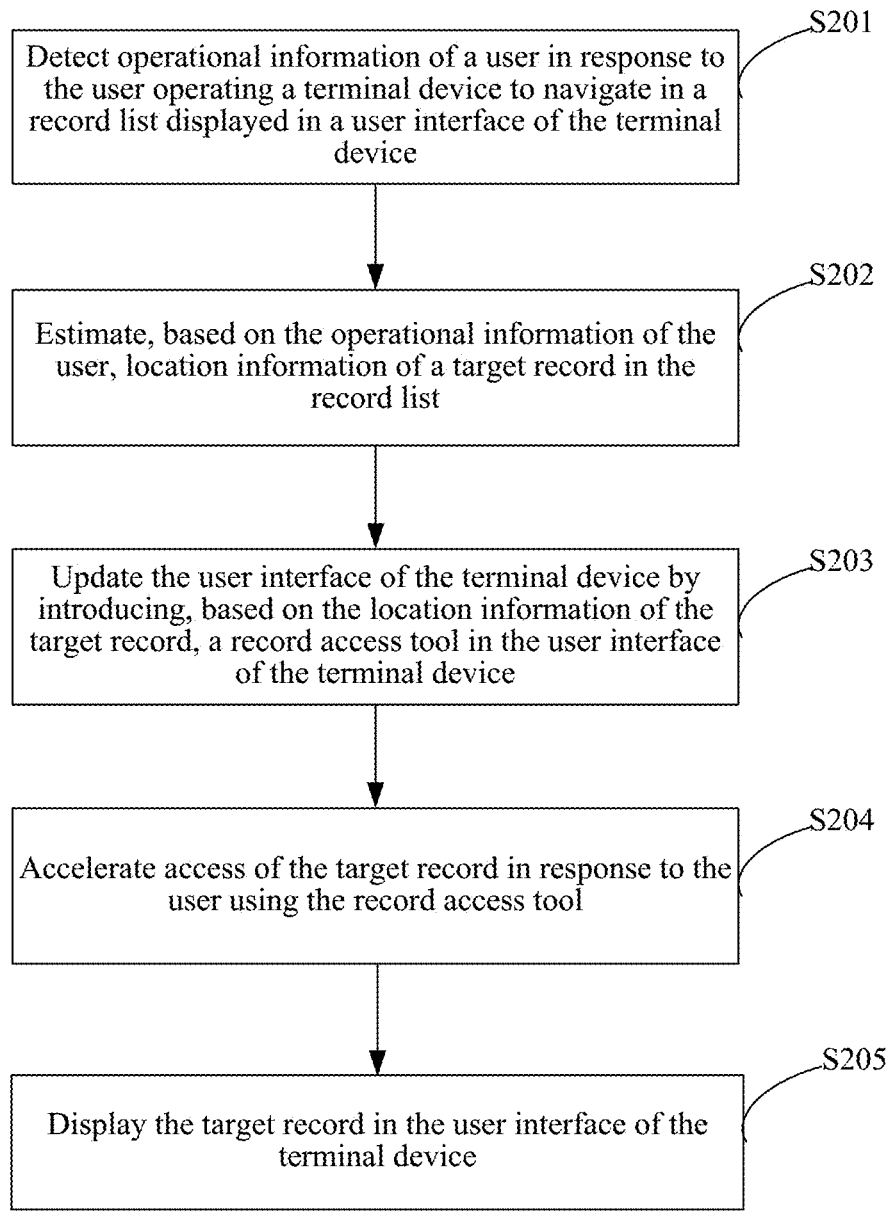
Figure 2:
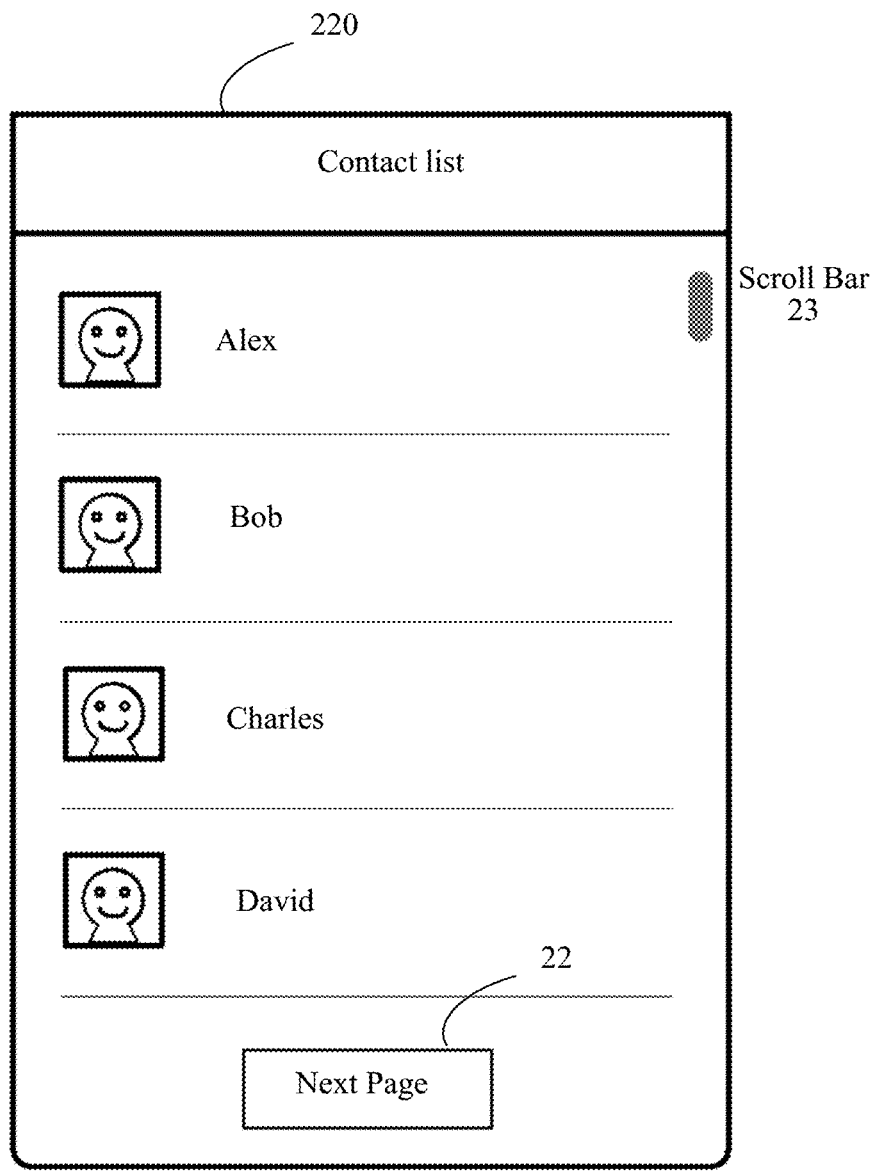

FIG. 2-1 is a flowchart illustrating another method 200 performed at a terminal device for navigating in a record list in accordance with some embodiments. FIGS. 2-2~2-6 are schematic diagrams illustrating user interfaces of the terminal device associated with the method 200 in FIG. 2-1. The terminal device performing the method 200 (e.g., the terminal device in FIGS. 2-2~2-6) can be similar to the terminal device performing the method 100 described above with respect to FIG. 1. Particularly, the terminal device performing the method 200 can be any type of device that is configured to enable a user of the terminal device (e.g., a user of the terminal device in FIGS. 2-2~2-6) to navigate one or more record lists associated with (e.g., stored in and presented at) that terminal device. Moreover, the terminal device performing the method 200 is configured to enable the user to locate one or more particular records from the record lists, as described in detail below.

In some embodiments, the terminal device performing the method 200 can include one or more processors and memory. In such embodiments, the method 200 is governed by instructions or code of an application that are stored in a non-transitory computer readable storage medium of the terminal device and executed by the one or more processors of the server device. The application is associated with enabling efficient navigation of record lists for users of the terminal device. Such an application typically is stored in a memory of the terminal device, and executed at a processor of the terminal device. As a result of the application being executed, the method 200 is performed at the terminal device. As shown in FIG. 2-1, the method 200 includes the following steps.

At S201, the terminal device detects operational information of the user in response to the user operating the terminal device to navigate in the record list displayed in the user interface of the terminal device. Operations of S201 are similar to the operations of S101 described above with respect to FIG. 1.

FIG. 2-2 illustrates a user interface 220 of the terminal device, where the terminal device is configured to detect operational information of the user. As shown in FIG. 2-2, a portion of a contact list is displayed in the user interface 220. The user interface 220 displays a "next page" button 22, which is used by the user to navigate to next page of the contact list (e.g., by clicking the button 22). The user interface 220 also displays a scroll bar 23, which is used by the user to navigate upward and/or downward in the page currently displayed in the user interface 220.

In some embodiments, for example, the terminal device can detect a number of the button 22 being activated (e.g., clicked by the user) as operational information associated with operations of the user in navigating the contact list. Similarly, the terminal device can detect a number of pages of the contact list being displayed in the user interface 220 as operational information associated with operations of the user in navigating the contact list. In some other embodiments, for example, the terminal device can detect a speed of the user navigating the contact list as the operational information, which can be measured in the number of pages of the contact list displayed in the user interface 220 (or the number of clicks on the button 22) in a unit of time (e.g., per minute).

Figures 2, 3:
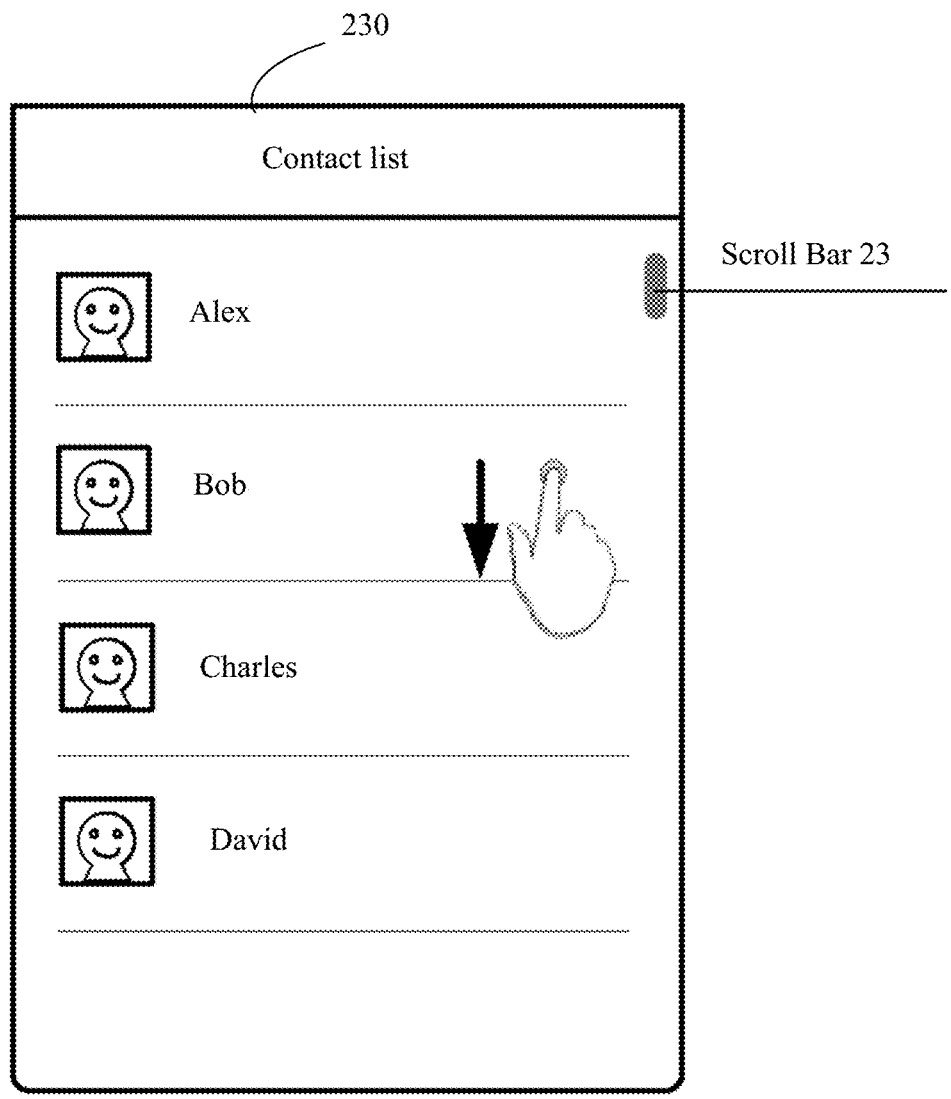

FIG. 2-3 illustrates a user interface 230 of the terminal device, where the terminal device is configured to detect operational information of the user. As shown in FIG. 2-3, a portion of a contact list is displayed in the user interface 230. Different from the user interface 220 in FIG. 2-2, the user interface 230 does not have a "next page" button. Similar to the user interface 220 in FIG. 2-2, the user interface 230 displays a scroll bar 23, which is used by the user to navigate upward and/or downward in the contact list currently displayed in the user interface 230.

In some embodiments, for example, the terminal device can detect a distance traveled by the scroll bar 23 as operational information associated with operations of the user in navigating the contact list. Similarly, the terminal device can detect a number of contacts from the contact list being displayed in the user interface 230 as operational information associated with operations of the user in navigating the contact list. In some other embodiments, for example, the terminal device can detect a speed of the user navigating the contact list as the operational information, which can be measured in the distance traveled by the scroll bar (or the number of contacts being displayed in the user interface 230) in a unit of time (e.g., per second).

At S202, the terminal device estimates, based on the operational information of the user, location information of a target record in the record list. Operations of S202 are similar to the operations of S102 described above with respect to FIG. 1. Subsequently, at S203, the terminal device updates the user interface of the terminal device by introducing, based on the location information of the target record, a record access tool in the user interface of the terminal device. Operations of S203 are similar to the operations of S103 described above with respect to FIG. 1.

Figures 2, 3, 4:
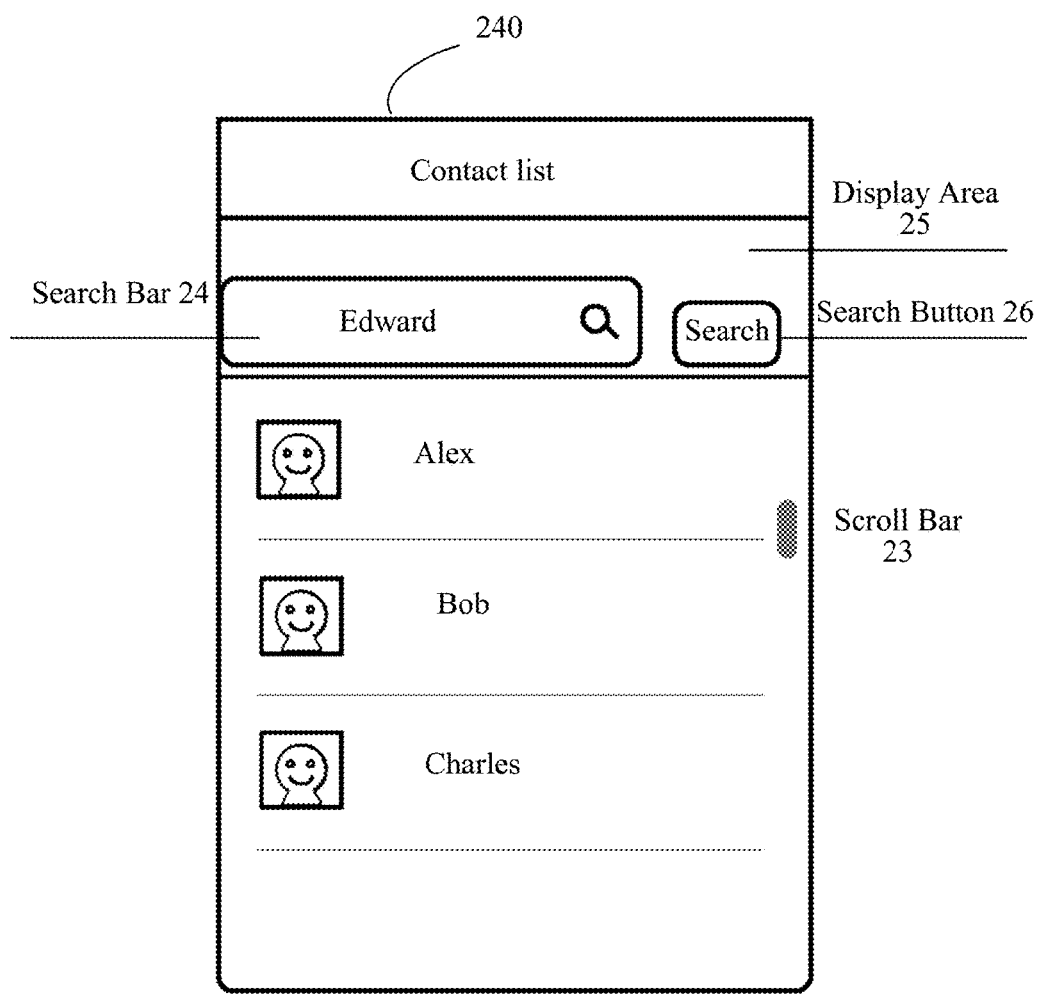
Figures 2, 3, 4, 5:
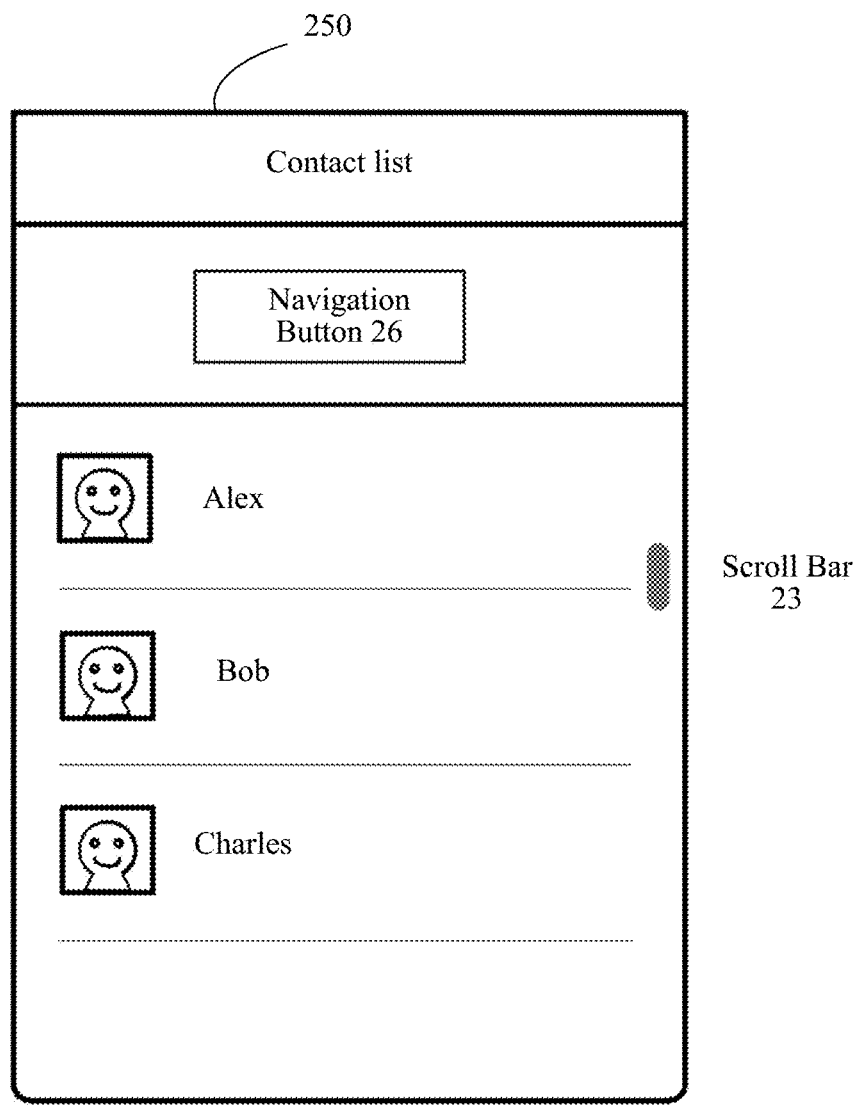
Figures 2, 3, 4, 5, 6:
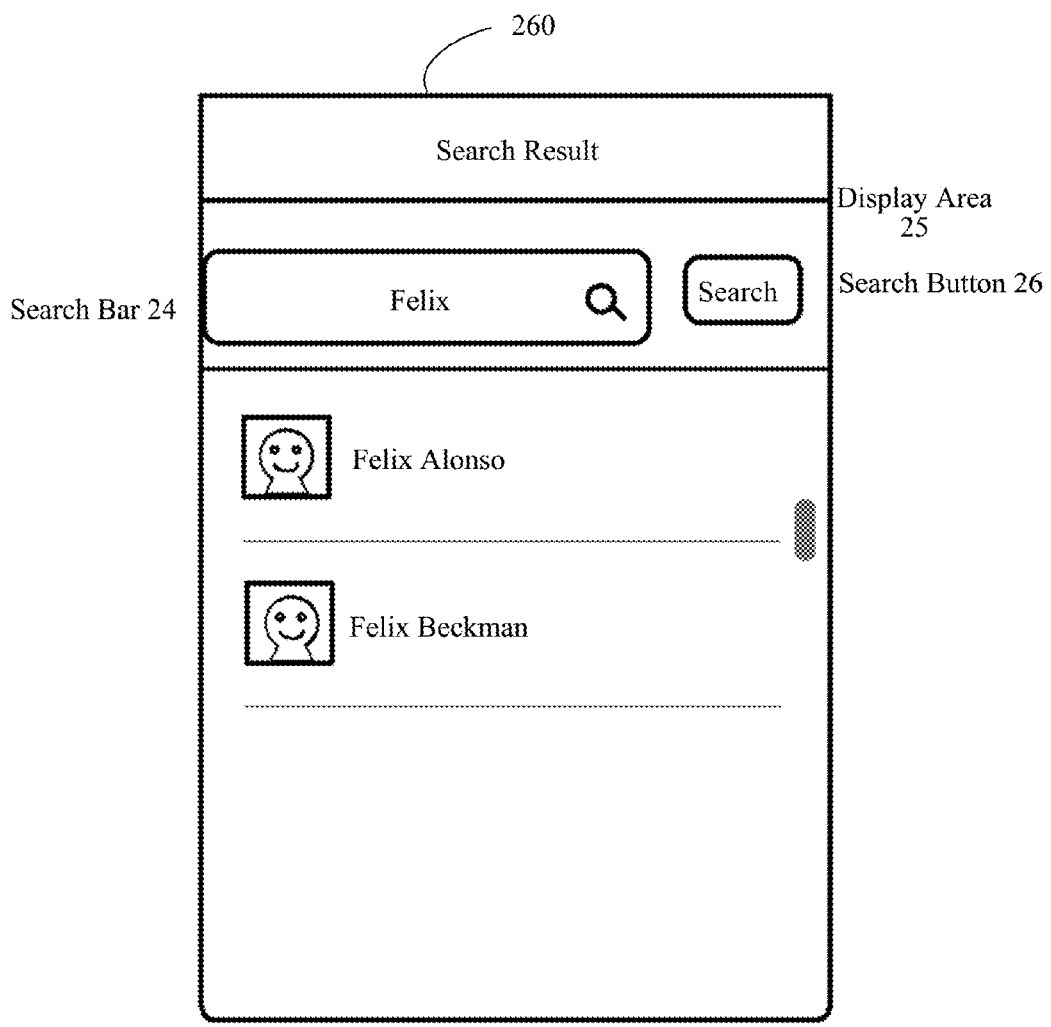
Figure 3:
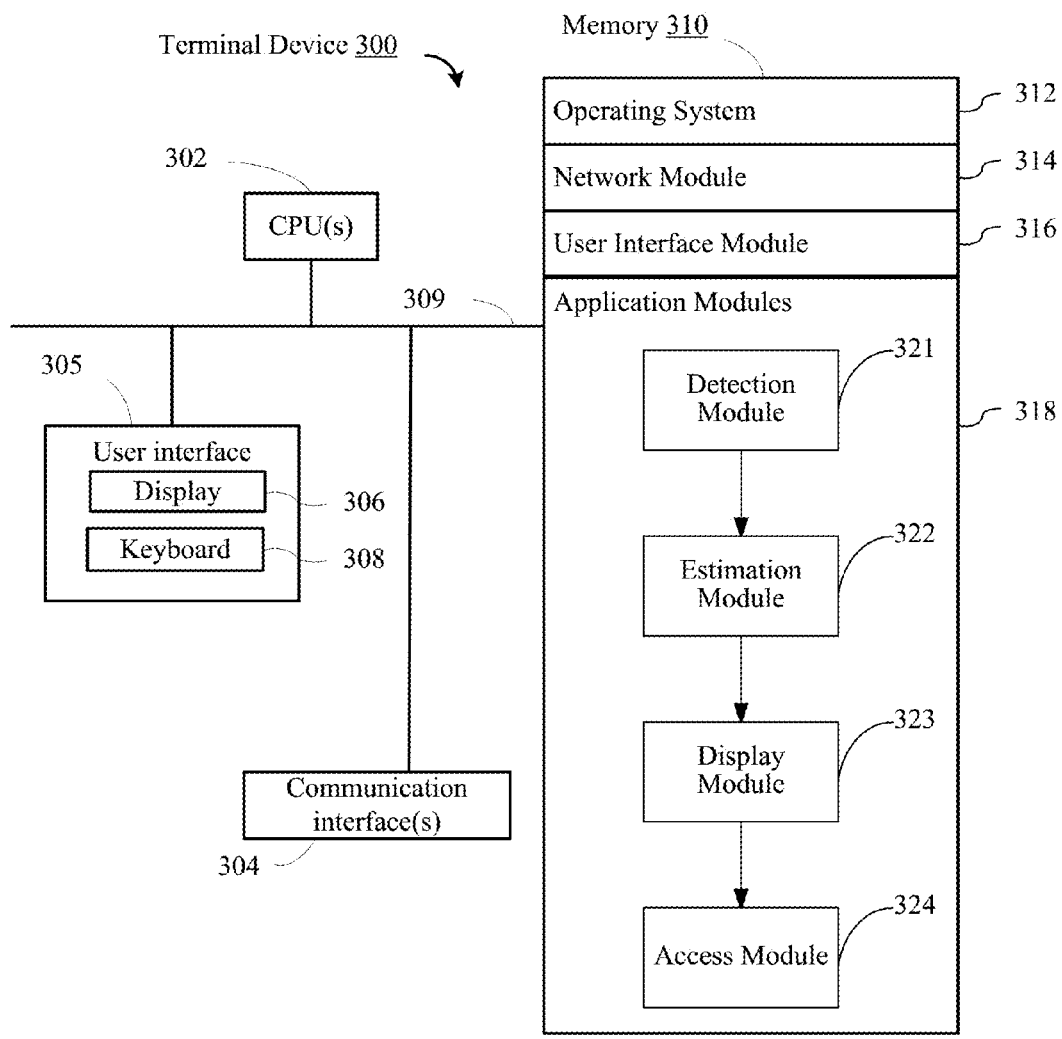

FIG. 2-4 illustrates a user interface 240 of the terminal device, where the terminal device is configured to introduce a search bar 24 and a search button 26 as a record access tool in the user interface 240. As shown in FIG. 2-4, a portion of a contact list is displayed in the user interface 240. The user interface 240 displays the search bar 24 and the search button 26 in a display area 25 on top of the contacts. Similar to the user interfaces 220 and 230 in FIGS. 2-2, 2-3, the user interface 240 also displays a scroll bar 23 to enable the user navigating upward and/or downward in the contacts currently displayed in the user interface 240.

In some embodiments, as described above, the terminal device can introduce such a record access tool in the user interface 240 in response to estimated location information (based on operational information of the user) indicating that the user is searching for a particular contact from the contact list. In such embodiments, although not shown in FIG. 2-4, the terminal device does not introduce the record access tool (including the search bar 24 and the search button 26) in absence of such estimated location information (which indicates that the user is searching for a particular contact from the contact list). In other words, the user interface 240 does not display the search bar 24 and the search button 26 when the estimated location information does not indicate that the user is searching for a particular contact from the contact list. As a result of the record access tool not being introduced in the user interface 240, more contacts from the contact list can be displayed at the same time (i.e., in the current screen) in the user interface 240 than those shown in FIG. 2-4. For example, four contacts rather than three contacts (as shown in FIG. 2-4) can be displayed at the same time in the user interface 240.

After the terminal device introduces the record access tool, as shown in FIG. 2-4, the user enters a key word "Edward" into the search bar 24. The user can then activate a search of contact from the contact list based on the key word (Edward) by, for example, clicking the search button 26 or clicking the magnifier icon in the search bar 24.

FIG. 2-5 illustrates a user interface 250 of the terminal device, where the terminal device is configured to introduce a navigation button 26 as a record access tool in the user interface 250. As shown in FIG. 2-5, a portion of a contact list is displayed in the user interface 250. The user interface 250 displays the navigation button 26 on top of the contacts. Such a navigation button can be, for example, an up arrow icon, a down arrow icon, a "first page" button, a "last page" button, and/or the like. Similar to the user interfaces 220, 230, 240 in FIGS. 2-2~2-4, the user interface 250 also displays a scroll bar 23 to enable the user navigating upward and/or downward in the contacts currently displayed in the user interface 250. After the terminal device introduces the record access tool, as shown in FIG. 2-5, the user can direct the display of the contact list to her desired location in the contact list (or to her desired contact from the contact list) by activating (e.g., clicking) the navigation button 26. In some embodiments, after the display of the contact list is directed to the new location in the contact list, the navigation button 26 is not displayed in the user interface.

In some embodiments, as described above, the terminal device can introduce such a record access tool in the user interface 250 in response to estimated location information (based on operational information of the user) indicating that the user is trying to reach a particular location in the contact list (e.g., the beginning of the contact list, the end of the contact list, etc.), or to view a particular contact from the contact list (e.g., the first contact from the contact list, the last contact from the contact list). In such embodiments, although not shown in FIG. 2-5, the terminal device does not introduce the record access tool (including the navigation button 26) in absence of such estimated location information (which indicates that the user is trying to reach a particular location in the contact list). In other words, the user interface 250 does not display the navigation button 26 when the estimated location information does not indicate that the user is trying to reach a particular location in the contact list. As a result of the record access tool not being introduced in the user interface 250, more contacts from the contact list can be displayed at the same time (i.e., in the current screen) in the user interface 250 than those shown in FIG. 2-5. For example, four contacts rather than three contacts (as shown in FIG. 2-5) can be displayed at the same time in the user interface 250.

At S204, the terminal device accelerates access of the target record in response to the user using the record access tool. Operations of S204 are similar to the operations of S104 described above with respect to FIG. 1. At S205, the terminal device displays the target record in the user interface of the terminal device. For example, if the target record is the first record of the record list (or equivalently, the beginning of the record list), the terminal device displays, in the user interface, a beginning portion of the record list including at least the first record of the record list. For another example, if the target record is the last record of the record list (or equivalently, the end of the record list), the terminal device displays, in the user interface, an end portion of the record list including at least the last record of the record list. For yet another example, if the target record is one or more records searched by the user (e.g., using a search bar), the terminal device displays, in the user interface, the one or more records as a search result.

FIG. 2-6 illustrates a user interface 260 of the terminal device, where the terminal device is configured to display contacts, as a search result from a contact list, in the user interface 260. The user interface 260 displays, in the display area 25 on top of the contacts, the search button 26 and the search bar 24 including a key word "Felix" entered into the search bar 24 by the user. As shown in FIG. 2-6, the search result includes a contact named "Felix Alonso" and a contact named "Felix Beckman." In some embodiments, the user can perform a new search in the contact list by, for example, entering a new key word into the search bar 24 and then activating the search button 26.

FIG. 3 is a block diagram of a terminal device 300 configured to navigate in a record list in accordance with some embodiments. The terminal device 300 can be structurally and functionally similar to the terminal devices described with respect to FIGS. 1~2-6. The exemplary terminal device 300 typically includes one or more processing units (CPU's) 302, one or more network or communications interfaces 304, memory 310, and one or more communication buses 309 for interconnecting these components and with other computer systems (e.g., the first and second terminals). The communication buses 309 may include circuitry (sometimes called a chipset) that interconnects and controls communications between system components. The terminal device 300 may optionally include a user interface 305, for instance, a display 306, and a keyboard 308. Memory 310 may include high speed random access memory and may also include non-transitory computer readable medium, such as one or more magnetic disk storage devices. Memory 310 may include mass storage that is remotely located from the CPU's 302. In some implementations, memory 310 stores the following programs, modules and data structures, or a subset or superset thereof:

- an operating system 312 that includes procedures for handling various basic system services and for performing hardware dependent tasks;
- a network module 314 that is used for connecting the terminal device 300 to the client terminals and other computer systems via one or more communication networks (wired or wireless), such as the Internet, other wide area networks, local area networks, metropolitan area networks, and so on;
- a user interface module 316 configured to receive user inputs through the user interface 305; and
- a number of application modules 318 including a detection module 321, an estimation module 322, a display module 323 and an access module 324, each module configured for performing operations as described above in connection with FIGS. 1~2-6.

In some embodiments, each module included in the terminal device 300 can be a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the terminal device 300 (not shown in FIG. 3) and executed at a processor (e.g., a CPU) of the terminal device 300 (not shown in FIG. 3). Overall, the detection module 321, the estimation module 322, the display module 323 and the access module 324 can be configured to collectively perform the methods 100 and 200 shown and described above with respect to FIGS. 1 and 2-1. In other words, the detection module 321, the estimation module 322, the display module 323 and the access module 324 can be configured to collectively accelerate access of a record list for a user based on operations of the user performed on the terminal device 300.

Specifically, the detection module 321 is configured to, among other functions, detect operational information of the user in response to the user operating the terminal device 300 to navigate in the record list displayed in a user interface of the terminal device 300. That is, the detection module 321 is configured to perform S101 of the method 100 and S201 of the method 200. In some embodiments, as described above with respect to S101 of the method 100, the operational information detected by the detection module 321 is associated with operations performed by the user on the terminal device 300. The user can perform operations on the terminal device 300 using any body part of the user (e.g., finger, voice command, etc.) or any type of tool (e.g., mouse, keyboard, stylus pen, etc.). The user can operate the terminal device 300 to navigate the record list displayed in the user interface of the terminal device 300 in any suitable method. Additionally, the operational information detected by the detection module 321 can include information of any type of characteristic of the operations performed by the user on the terminal device 300.

The estimation module 322 is configured to, among other functions, estimate, based on the operational information of the user, location information of a target record in the record list. That is, the estimation module 322 is configured to perform S102 of the method 100 and S202 of the method 200. In some embodiments, as described above with respect to S102 of the method 100, the location information can be estimated by the estimation module 322 based on comparing the detected operational information with, for example, a predefined threshold. In some embodiments, the estimation module 322 can be configured to estimate location information based on various types of operational information of the user. In some embodiments, the location information estimated by the estimation module 322 can be used to indicate different objectives of the user associated with navigating the record list.

The display module 323 is configured to, among other functions, display, based on the location information of the target record, a record access tool in the user interface of the terminal device 300. That is, the display module 323 is configured to perform S103 of the method 100 and S203 of the method 200. In some embodiments, as described above with respect to S103 of the method 100, the record access tool can be any type of tool that can be displayed in the user interface and can, if used by the user, assist the user to accelerate access of the record list (e.g., locate the target record quickly). Such a record access tool can include, for example, a search bar, a navigation icon, any other suitable type of tool, or any combination of different types of tools.

The access module 324 is configured to, among other functions, accelerate access of the target record in response to the user using the record access tool. That is, the access module 324 is configured to perform S104 of the method 100 and S204-S205 of the method 200. For example, the user enters a key word associated with a target record into a search bar and activates the search (e.g., by clicking a search button in the user interface, by pressing the enter key in a keyboard, etc.), then the access module 324 executes a search in the record list based on the entered key word, and displays one or more records from the record list, as the search result, in the user interface. For another example, the user activates (e.g., by clicking) a navigation icon (e.g., an up-arrow button) directing to the beginning of the record list, then the access module 324 displays, in the user interface, a beginning portion of the record list including at least the first record from the record list.

While shown and described above with respect to FIGS. 1-3 as a method and apparatus for navigating information records, in some embodiments, a similar method and/or apparatus can be used in other operations on a terminal device. For example, a terminal device can detect operational information of a user continuously closing tabs of a web browser. The terminal device can determine, based on the detected operational information that the user intends to close all the tabs that are currently open in the web browser. The terminal device can then introduce an operation tool (e.g., a pop-up message) that enables the user to close all the tabs by one simple operation (e.g., clicking a button).

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of navigating in a record list, comprising:
   at a terminal device having one or more processors and memory for storing programs to be executed by the one or more processors:
      displaying a portion of a record list including a plurality of items in a user interface of the terminal device;
      detecting operational information of a user in response to the user operating the terminal device to navigate in the record list displayed in the user interface of the terminal device, wherein the operational information includes a speed and a direction of the user navigating through the record list;
      estimating, based on the operational information of the user, location information of a target record in the record list by comparing the speed of the user navigating through the record list with a predetermined threshold; and
      in accordance with a determination that the speed of the user navigating through the record list is greater than the predetermined threshold, updating the user interface of the terminal device by introducing, based on the location information of the target record, a record access tool in the user interface of the terminal device to accelerate access of the target record using the record access tool, wherein updating the user interface comprises:
         in accordance with a determination that the user navigates through the record list in a random direction, displaying a search tool for the user to search for the target record when activated by the user; and
         in accordance with a determination that the user navigates through the record list in a fixed direction, displaying a navigation tool for the user to navigate to a predetermined record from the record list corresponding to the fixed direction in response to the user activating the navigation tool.

2. The method of claim 1, wherein the search tool is a search bar to accelerate access of the target record by searching a key word associated with the target record using the search bar.

3. The method of claim 1, wherein the navigation tool is a navigation icon to update the user interface to display the predetermined record from the record list in response to the user activating the navigation icon.

4. The method of claim 3, wherein the operational information indicates a direction of the user navigating through the record list.

5. The method of claim 3, wherein the predetermined record from the record list is one of the first record and the last record from the record list.

6. The method of claim 1, wherein the record access tool is not introduced in the user interface of the terminal device in accordance with a determination that the speed of the user navigating through the record list is slower than the predetermined threshold.

7. A terminal device, comprising:
   one or more processors; and
   memory storing one or more programs to be executed by the one or more processors, the one or more programs comprising instructions for:
      displaying a portion of a record list including a plurality of items in a user interface of the terminal device;
      detecting operational information of a user in response to the user operating the terminal device to navigate in the record list displayed in the user interface of the terminal device, wherein the operational information includes a speed and a direction of the user navigating through the record list;
      estimating, based on the operational information of the user, location information of a target record in the record list by comparing the speed of the user navigating through the record list with a predetermined threshold; and
      in accordance with a determination that the speed of the user navigating through the record list is greater than the predetermined threshold, updating the user interface of the terminal device by introducing, based on the location information of the target record, a record access tool in the user interface of the terminal device to accelerate access of the target record using the record access tool, wherein updating the user interface comprises:
         in accordance with a determination that the user navigates through the record list in a random direction, displaying a search tool for the user to search for the target record when activated by the user; and
         in accordance with a determination that the user navigates through the record list in a fixed direction, displaying a navigation tool for the user to navigate to a predetermined record from the record list corresponding to the fixed direction in response to the user activating the navigation tool.

8. The terminal device of claim 7, wherein the search tool is a search bar to accelerate access of the target record by searching a key word associated with the target record using the search bar.

9. The terminal device of claim 7, wherein the navigation tool is a navigation icon to update the user interface to display the predetermined record from the record list in response to the user activating the navigation icon.

10. The terminal device of claim 9, wherein the operational information indicates a direction of the user navigating through the record list.

11. The terminal device of claim 9, wherein the predetermined record from the record list is one of the first record and the last record from the record list.

12. The terminal device of claim 7, wherein the record access tool is not introduced in the user interface of the terminal device in the record list in accordance with a determination that the speed of the user navigating through the record list is slower than the predetermined threshold.

13. A non-transitory computer readable storage medium storing one or more programs, the one or more programs comprising instructions, which, when executed by one or more processors, cause the processors to perform operations comprising:

at a terminal device:
displaying a portion of a record list including a plurality of items in a user interface of the terminal device;
detecting operational information of a user in response to the user operating the terminal device to navigate in the record list displayed in the user interface of the terminal device wherein the operational information includes a speed and a direction of the user navigating through the record list;
estimating, based on the operational information of the user, location information of a target record in the record list by comparing the speed of the user navigating through the record list with a predetermined threshold; and
in accordance with a determination that the speed of the user navigating through the record list is greater than the predetermined threshold, updating the user interface of the terminal device by introducing, based on the location information of the target record, a record access tool in the user interface of the terminal device to accelerate access of the target record using the record access tool, wherein updating the user interface comprises:
in accordance with a determination that the user navigates through the record list in a random direction, displaying a search tool for the user to search for the target record when activated by the user; and
in accordance with a determination that the user navigates through the record list in a fixed direction, displaying a navigation tool for the user to navigate to a predetermined record from the record list corresponding to the fixed direction in response to the user activating the navigation tool.

14. The non-transitory computer readable storage medium of claim 13, wherein the search tool is a search bar to accelerate access of the target record by searching a key word associated with the target record using the search bar.

15. The non-transitory computer readable storage medium of claim 13, wherein the navigation tool is a navigation icon to update the user interface to display the predetermined record from the record list in response to the user activating the navigation icon.

16. The non-transitory computer readable storage medium of claim 13, wherein the record access tool is not introduced in the user interface of the terminal device in accordance with a determination that the speed of the user navigating through the record list is slower than the predetermined threshold.

* * * * *